United States Patent [19]

Bellati et al.

[11] 4,236,425
[45] Dec. 2, 1980

[54] BALANCING ARRANGEMENT FOR ROTATING MACHINERY

[75] Inventors: Hans Bellati, Wettingen, Switzerland; Heinz Brünner, Waldshut, Fed. Rep. of Germany

[73] Assignee: BBC Brown, Boveri & Co. Ltd., Baden, Switzerland

[21] Appl. No.: 921,908

[22] Filed: Jul. 5, 1978

[30] Foreign Application Priority Data

Jul. 8, 1977 [CH] Switzerland .................. 8469/77

[51] Int. Cl.³ ............................................. F16F 15/28
[52] U.S. Cl. ................................................ 74/573 R
[58] Field of Search .................... 74/573 R; 73/66; 310/151; 308/146, 147

[56] References Cited

U.S. PATENT DOCUMENTS

| | | | |
|---|---|---|---|
| 430,270 | 6/1890 | Cook | 74/573 |
| 1,172,947 | 2/1916 | Coppage | 74/573 |
| 1,949,478 | 3/1934 | Kindelmann et al. | 74/573 |
| 2,861,471 | 11/1958 | Kronenberg | 74/573 |

*Primary Examiner*—Louis Rimrodt
*Attorney, Agent, or Firm*—Burns, Doane, Swecker & Mathis

[57] ABSTRACT

A balancing arrangement for rotating machinery has a pressure lock permitting access to the rotor without disturbing a pressurized rotor housing. The pressure lock is carried on a cover of the housing by threads which permit an inward movement of the pressure lock. A sealing cover which is provided on the pressure lock isolates the housing from the atmosphere when the rotor operates. A safety hood protects the pressure lock during operation of the machinery. Balancing of the rotor is accomplished by moving the lock against the rotor and removing the sealing cover, thereby permitting access to balancing weights in the rotor.

6 Claims, 2 Drawing Figures

BALANCING ARRANGEMENT FOR ROTATING MACHINERY

BRIEF DESCRIPTION AND BACKGROUND OF THE PRESENT INVENTION

The present invention relates generally to a balancing arrangement for rotating machines, especially turbomachines. In rotating machines, an interior space of a housing of the machines is typically at a higher or lower pressure relative to the atmosphere. The present invention relates more particularly to a balancing arrangement for a rotating machine having a housing which is provided with covers for openings to be used during assembly and maintenance of the machines and where one or more balancing weights are provided for the rotating members.

The housings of large machines having rotatable members, especially of turbomachines, generally have either a positive and/or negative pressure with respect to the surrounding atmosphere both during operation of the machines and when the machines are about to operate. When such machine, or respectively the rotor of such machine, requires balancing or rebalancing, the covers of the housing openings which provide access to the rotor must be removed. Accordingly, a communication is established between the atmospheric pressure surrounding the machinery and the positive and/or negative pressure within the housing. This communication will interrupt the operating conditions within the machine housing, and may result in a loss of costly gas fillings. Consequently, extensive delays in the restarting of the machine must oftentimes be accepted. For example, hydrogen is often used for gas fillings, especially in the case of gas-cooled generators, and due to its nature will be lost upon the opening of the housing.

In the case of known balancing arrangements, the balancing of rotors in assembled machines is being achieved by having the balancing weights both installed and secured in bores that are provided for this purpose within the rotors. However, the weights can be installed only by opening up the housing of the rotating machinery, for example of a turbomachine or a generator.

It is an object of the present invention to provide a balancing arrangement whereby a rebalancing of a rotor becomes possible either without equalizing a gas filling or a positive or negative pressure existing in the machine housing with the surrounding atmospheric pressure, or respectively without the escape of the gas filling, present inside the housing, into the atmosphere.

In the present invention a movable screw-in pressure lock having a male thread is provided in a cover of a housing of machinery for the purpose of maintaining a difference in pressure in the housing of the machinery relative to the atmosphere during a rebalancing of a rotor.

It will be particularly advantageous to arrange a sealing cover at the pressure lock to seal the pressure lock with respect to the surrounding atmosphere. Furthermore, it is advantageous to provide a sealing surface for the pressure lock with the sealing surface to be urged into contact with the rotor.

The arrangement of the present invention has a particular advantage in that the installation of a pipe with a male thread, constructed as a pressure lock, into each individual cover of the housing and the placement of a mechanically fastened seal against the atmosphere at the contact areas of the cover will allow a rebalancing of the rotor in a simple manner without any communication either of the positive or negative pressure or of the gas filling within the machine housing with the surrounding atmosphere. By means of this arrangement and for the purpose of balancing the rotor, the pipe serving as the pressure lock is screwed into the housing until a tube end of the pressure lock carrying the sealing surface and facing the balancing plane at the rotor makes contact with a machined surface of a balancing plane of the rotor. The sealing cover which is provided on the pressure lock on the side of the surrounding atmosphere is then removed, and it then becomes possible to install the appropriate balance weights in the rotor by the use of suitable tools. The weights are installed through the pressure lock existing between the outer atmosphere and the higher and/or lower pressure area in the housing without disturbing the state of pressure existing within the housing.

It is still further advantageous in the present invention to provide a sealing safety hood for the pressure lock to protect the pressure lock during operation of the rotatable member.

The arrangement of a safety hood covering an entrance opening of the pressure lock will prevent any unintentional opening of the pressure lock even in the event of an unscheduled and careless handling of the covers.

BRIEF DESCRIPTION OF THE DRAWINGS

The present invention will be described with reference to the accompanying drawings in which like members bear like reference numerals and wherein.

DETAILED DESCRIPTION OF THE PRESENT INVENTION

Figure 1:
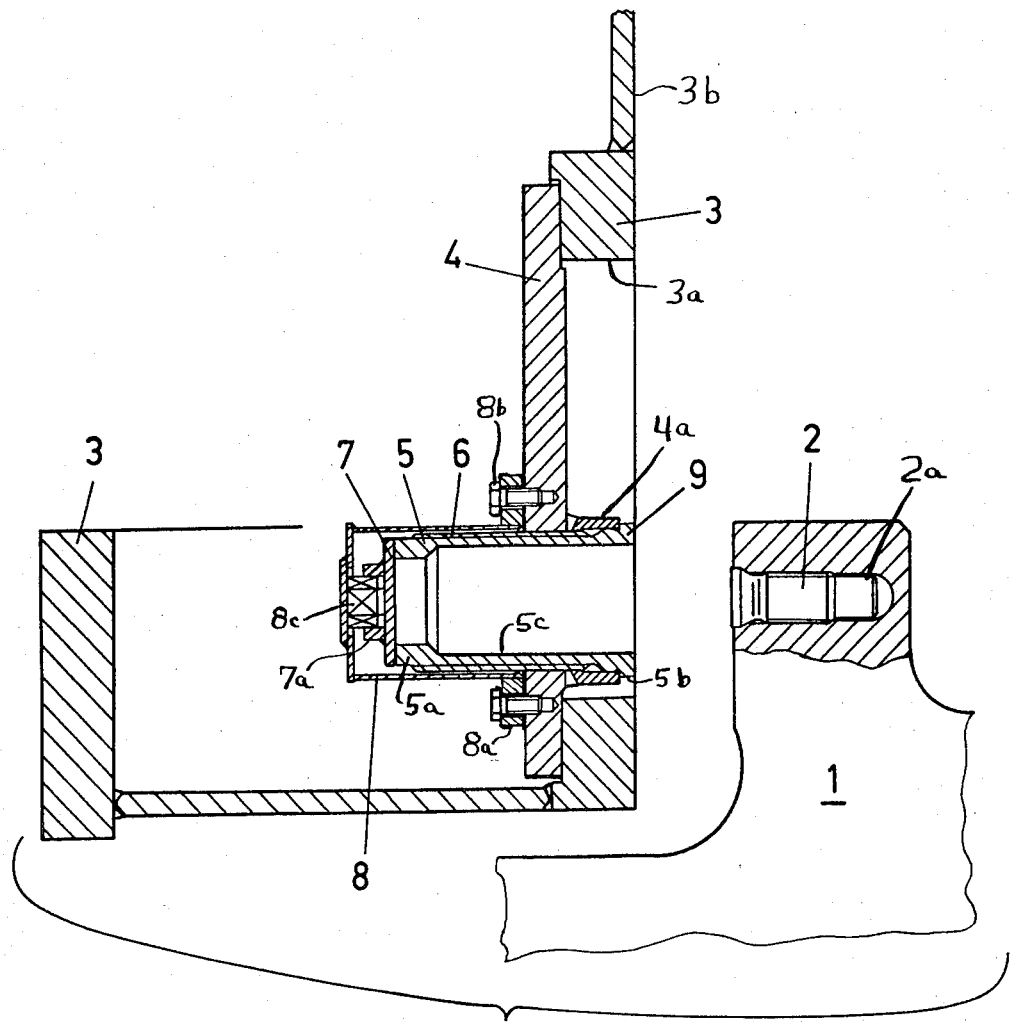
FIG. 1 is a cross-sectional view of a portion of a rotating machine and a pressure lock according to the present invention with the pressure lock withdrawn from the housing.

With reference now to FIG. 1, a rotor 1 of a turbomachine is provided with axially extending openings 2 each of which may receive one or more balance weights 2a. The rotor 1 is rotatably mounted within a housing 3 that has a plurality of circumferentially spaced openings 3a, each of which is in axial registry with a weight receiving opening 2. A plurality of covers 4 for the housing opening 3a are attached to the housing. Each cover 4 includes a pressure lock 5 which includes an axially extending tube 5a having an external male thread 6. The tube 5a is screwed into a matching internally threaded portion of the cover 4 and is coaxially arranged with a weight receiving opening 2a. The pressure lock 5 also includes a sealing cover 7 at one end which faces away from the interior of the housing 3. The sealing cover 7 creates a pressure tight seal and is arranged so that it can be unscrewed from the pressure lock 5. A safety hood 8 covers the pressure lock 5 and is connected with the cover 4 in such manner that it will provide an additional pressure seal between the atmosphere surrounding the housing 3 and the interior pressure of the housing.

To secure the safety hood 8 to the cover plate 4, the hood includes a radially extending flange 8a which is attached to the cover 4 with suitable fasteners 8b. The hood 8 also may include an inwardly extending projection 8c that is received by a conforming socket 7a in the sealing cover 7. In this manner, the tube 5a will be held in a rotationally fixed position at those times when balancing operations are not being conducted.

The cover plate 4 may also include an abutment collar 4a projecting inwardly from the cover plate but not extending beyond the inner surface 3b of the housing. A radially extending abutment flange 5b provided at the inner end of the tube 5 cooperates with the collar 4a to limit outward movement of the tube 5. In this fashion, the tube cannot be inadvertently removed from the cover plate which would allow communication between the interior and exterior of the housing 3. Moreover, a pressure seal may be effected between the collar 4a and the flange 5b.

Figure 2:
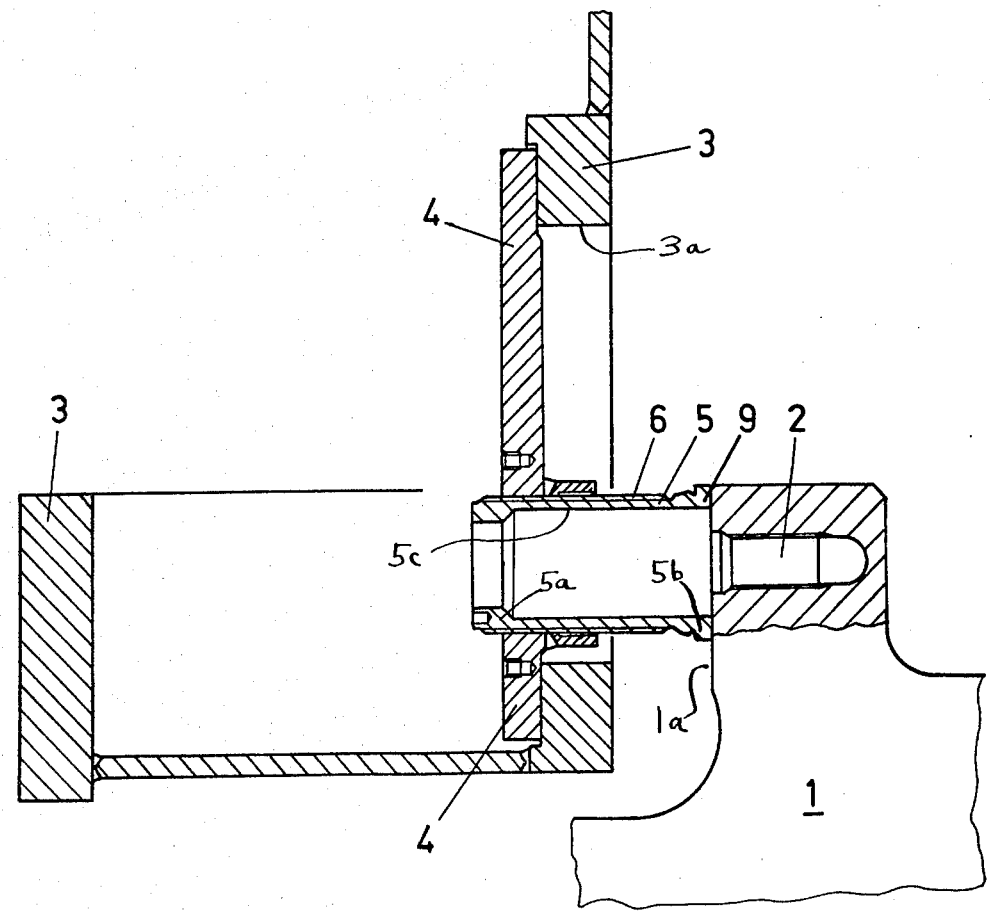
FIG. 2 is a cross-sectional view of the portion of the rotating machine of FIG. 1 with the pressure lock inserted into the housing.

With reference now to FIG. 2, when a balancing operation is performed on an assembled turbomachine, the rotor 1 is first turned or rotated so that one of the openings 2, accommodating one of the balance weights, is positioned exactly opposite to the opening of the pressure lock 5. Then, the pressure lock arrangement of the present invention may be moved into engagement with the rotor 1 after safety hood 8 is removed. The pressure lock 5 is moved inwardly by rotating the tube to advance it by means of the male thread 6 into the cover 4 of the housing 3 sufficiently to fit snugly against the rotor 1. With the flange 5b of the tube tightly against the flat surface of the rotor 1, the sealing cover 7 may be removed from the exposed end of the tube 5a.

A sealing surface 9 of the lock 5 is thus in pressure sealing contact with a face 1a of the rotor 1. When the sealing cover 7 has been removed, the opening 5c in the tube 5a of the pressure lock 5 will allow the placement or removal of a balancing weight into the proper opening 2 by means of suitable tools. When the balancing weight has been either placed into or removed from the opening 2, the sealing cover 7 is again attached to the tube 5a of the pressure lock 5. The pressure lock is then unscrewed away from the rotor 1 by means of its male thread 6 in an outward direction. Finally, the safety hood 8 is again mounted on the pressure lock 5 when the lock has reached a final outer position.

From the foregoing description, it will be apparent that pressure lock assembly of this invention permits a turbomachine rotor to be balanced without removing the cover and establishing communication with the atmosphere. Thus, balancing can be effected while maintaining the internal pressure of the machine and without contaminating or losing the gaseous working fluid therein.

It should now be apparent that a novel balancing arrangement for rotating machinery has been disclosed which provides numerous advantages over the prior art. Moreover, it will be apparent to those skilled in the art that numerous modifications, variations, substitutions and equivalents exist for features of this invention. Accordingly, it is expressly intended that all such modifications, variations, substitutions and equivalents which fall within the spirit and scope of the invention as defined in the appended claims be embraced thereby.

What is claimed is:

1. A balancing arrangement for rotating machinery, comprising:
   a rotatable member;
   at least one balancing weight opening carried by the rotating member;
   housing means for enclosing the rotating member having an interior pressure other than atmospheric pressure and having at least one opening to provide access both to the rotatable member and to at least one balance weight opening;
   cover means for covering the at least one opening in the housing; and
   pressure lock means for permitting access to the at least one balancing weight opening while maintaining the interior pressure of the housing, the pressure lock means being carried by the cover means.

2. The balancing arrangement of claim 1, further comprising:
   sealing cover means for sealing the pressure lock means, the sealing cover means being carried by the pressure lock means.

3. The balancing arrangement of claim 1, wherein the pressure lock means includes a pressure lock member which is threadably received by the cover means to permit the pressure lock means to be moved towards the rotating member, the pressure lock member having a sealing surface which is receivable by the rotatable member.

4. The balancing arrangement of claim 1, wherein the pressure lock means includes a safety hood means for additionally sealing the pressure lock means.

5. The balancing arrangement of claim 1, wherein the pressure lock means includes a pressure lock member which is threadably received by the cover means to permit the pressure lock means to be moved towards the rotating member.

6. The balancing arrangement of claim 5, wherein the pressure lock member has male threads and the cover means includes a threaded member having female threads which threadably receives the pressure lock member.

* * * * *